Oct. 10, 1944.  J. DERMODY  2,360,044
COMB OR STRIPPER FOR GUMMING MECHANISM AND THE LIKE
Filed June 28, 1941

INVENTOR
JOHN DERMODY
BY Charles A. Warren
ATTORNEY

Patented Oct. 10, 1944

2,360,044

UNITED STATES PATENT OFFICE 2,360,044

COMB OR STRIPPER FOR GUMMING MECHANISM AND THE LIKE

John Dermody, Holden, Mass., assignor to Economic Machinery Company, Worcester Mass., a corporation of Massachusetts Application June 28, 1941, Serial No. 400,214

3 Claims. (Cl. 91—58)

The present invention relates to a comb or stripper to cooperate with a gum roll, and particularly adapted for use with the gumming roll of a label applying machine.

The principal purpose of a comb or stripper of this character is to remove from the gumming roll a label inadvertently adhering thereto, and to prevent the label from reaching the supply of gum within the gum box. Prior devices of this character have utilized a comb or stripper having a plurality of spaced teeth engageable with the periphery of the gum roll. These spaced teeth however are ineffective for the complete removal of the label adhering to the roll, since parts of the label are still permitted to pass downwardly between the teeth of the comb and reach the gum supply in the form of torn scraps of paper. The principal object of the present invention is to provide a comb or stripper which will assure complete removal of the label or other article adhering to the gum roll and prevent the article or any part thereof from reaching the supply of gum.

Prior combs or strippers of this character have usually been arranged to engage with the periphery of the gum roll, and if the machine is stopped and the gum allowed to dry, the roll is then locked against turning by the adhesive connection with the comb, so that complete cleaning of the gumming mechanism is necessary before the machine can again be operated. A further object of the invention is to mount the comb or stripper so that it is normally out of contact with the periphery of the gum roll and will not therefore prevent the gum roll from turning, even should the gum be allowed to dry.

In the label applying machine of the Holm Patent No. 2,257,055, dated September 23, 1941, the gumming mechanism involves a pair of parallelly positioned gum rolls rotating in opposite directions and adapted for successive engagement with selected portions of the label. A further object of the invention resides in the provision of a single comb or stripper adapted for use with the pair of gum rolls, so that only one comb structure is necessary.

Other and further objects and advantages of the invention will hereinafter more fully appear from the following detailed description taken in connection with the accompanying drawing, in which—

Figure 1:
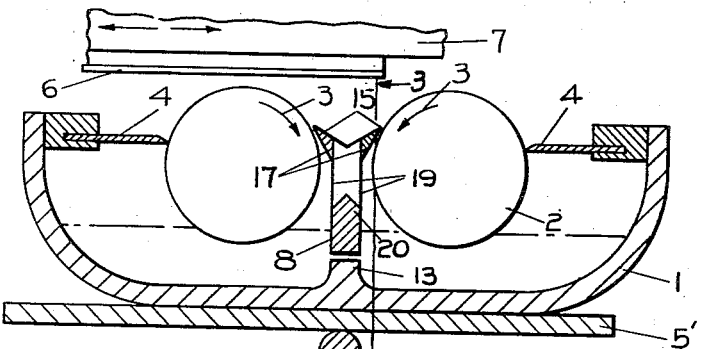
Fig. 1 is a sectional view through a gum box showing my improved comb or stripper mounted therein.

The accompanying drawing shows my improved comb or stripper in connection with gumming mechanism of the type disclosed by the Holm Patent No. 2,257,055, above referred to. It will be apparent, however, that the comb or stripper of my invention is equally usable either where a single gum roll is used or where a series of rolls are used, and can be utilized wherever a gumming roll might pick up a label or other sheet material during the operation of the machine in which the gumming mechanism is positioned.

With reference to the drawing, the gum box 1 has positioned therein spaced parallel gum rolls 2 suitably geared together, so that the upper surfaces of the rolls move toward each other as indicated by the arrows 3. Gum partially fills the box as shown, and doctor blades 4 positioned on the upwardly moving sides of the gum rolls distribute a uniform thickness of gum over the entire periphery of each roll.

In the arrangement shown, the gum box is adapted for oscillation about the axis of a shaft 5 which is suitably secured to a plate 5' on which the box is mounted. This oscillation elevates first one gum roll and then the other into the horizontal plane of movement of a label 6 reciprocated over the gum box by a horizontally reciprocable label carrier 7. The latter is suitably guided by any appropriate mechanism, not shown.

The label 6 which in the arrangement shown is held to the under side of the carrier by suction is very apt, by adhesion to either of the gum rolls, to be stripped from the carrier and carried downwardly by the roll toward and into the supply of liquid gum in the bottom of box 1. Such action is prevented by the comb or stripper 8 of my invention which, as shown, is positioned between the two rolls and operates, in the event of adhesion of the label to either roll, to remove the label from the roll and to cause the label to stay on the comb until removed.

Figure 3:
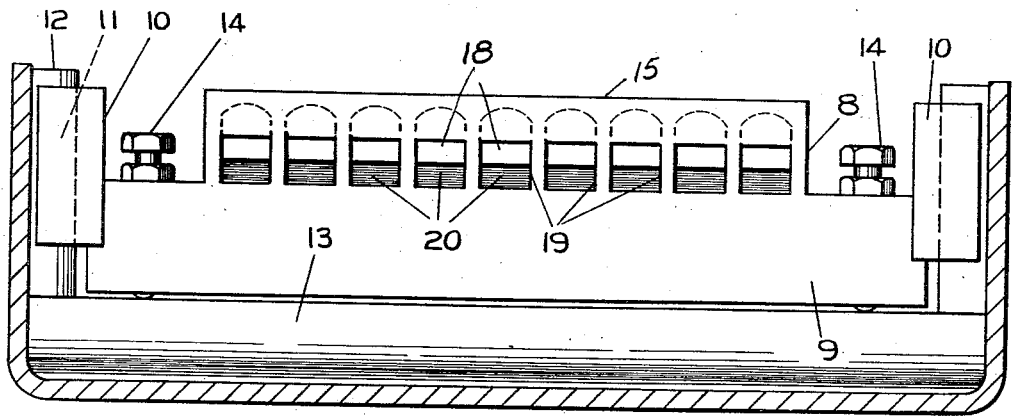
Fig. 3 is a sectional view through the gum box, substantially at right angles to Fig. 1, as along the line 3—3 of Fig. 1.
Figure 4:
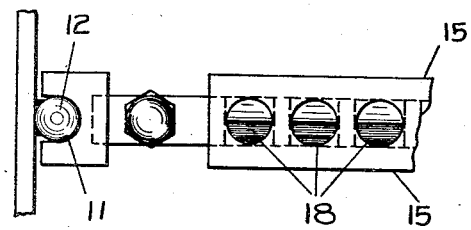
Fig. 4 is a plan view of a part of the comb. Like reference characters refer to like parts in the different figures.

As best shown in Figs. 3 and 4, the comb 8 comprises an elongated bar 9 having lugs 10 at the opposite ends. Each lug is recessed as shown at 11 for engagement with an upright guide post 12 on the interior of each side of box 1. These posts 12 are substantially in line with a transverse web 13, Fig. 1, rising from the bottom of the gum box to position the comb directly over the web as shown.

Adjacent each end of the bar 9 is an adjustable screw 14 extending vertically therethrough to provide for vertical adjustment of the comb within the gum box, and by this adjustment the bottom of the bar 9 is preferably spaced slightly above the web 13 to permit the passage of gum from one part of the box to the other.

Between the adjusting screws 14 at opposite ends of the bar, the upper side of the bar 9 is formed to have opposed relatively sharp corners 15 presenting continuous edges coextensive with the gumming rolls. The upper surfaces 16 of the opposed straight edges are preferably at an angle of approximately sixty degrees to the vertical, and the under surfaces 17 are at approximately thirty degrees to the vertical, although neither of these angles is critical.

The comb is positioned so that the opposed edges or corners 15 are somewhat above the horizontal plane of the gum roll axes, and preferably so positioned that the upper surfaces 16 are approximately tangential to the surfaces of the gum rolls. The comb is also formed so that the opposed edges or corners 15 will be spaced from the periphery of the gum rolls a distance substantially as great as the thickness of the layer of gum thereon, but still close enough to engage with the leading edge of any label adhering to and drawn down by a roll, thereby to strip such label from the roll. Since the comb does not normally come in contact with the layer of gum on the rolls, drying of the gum, when the device is not operating, cannot lock the gum roll and comb against relative movement.

The comb is provided with a large number of spaced vertical passages 18 therein communicating with side openings 19 below the straight edges, and at the lower end of each passage 18 the comb has a wedge-shaped portion 20 to cause flow of glue or gum entering the passages 18 to be directed to opposite sides of the comb.

Figure 2:
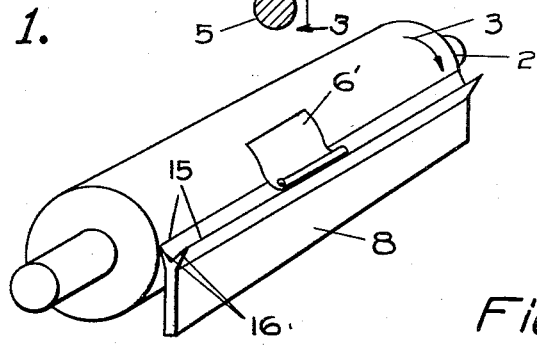
Fig. 2 is a perspective view showing the comb in relation to one of the gum rolls.

In operation, with the gum rolls rotating in the directions shown, if a label or other piece of paper should adhere to either gum roll, the leading edge of the label will be engaged by the comb and stripped from the roll. The relative angle of the surfaces 16 is such that the so-stripped label will tend to roll up, as shown at 6', Fig. 2, so that the operator of the machine may readily remove the entire label in one piece. The continuous edge of the comb prevents any scraps of paper from being carried past the comb and thus effectively prevents any paper from reaching the supply of gum.

It will be understood that the same or a similar comb or stripper can be used with gumming mechanism having only a single roll, and that such devices may be positioned adjacent any one or each of a series of gum rolls if such an arrangement is desirable. The invention contemplates, instead of a conventional comb having spaced teeth a comb or stripper having a continuous edge adjacent to a gumming roll and in a position to remove foreign matter from the surface of the roll. Such a structure is not the equivalent of a doctor blade and does not have a corresponding function.

I claim:

1. The combination with a gum box having a supply of gum therein, of a pair of rotary gum rolls partially submerged in the supply of gum and rotatable in opposite directions on substantially parallel axes, and a comb or stripper positioned between said gum rolls and effective on both, said comb or strip presenting a pair of continuous substantially straight edges, one of which is positioned adjacent to and in closely spaced relation to the periphery of each gum roll, said edges in each case being in opposed relation to the direction of the surface movement of the associated roll.

2. The combination with a gum box having a supply of gum therein, of a pair of rotary gum rolls partially submerged in the supply of gum and rotatable in opposite directions on substantially parallel axes, and a comb positioned between said gum rolls and presenting a pair of continuous substantially straight edges, one of which is positioned adjacent to and in closely spaced relation to the periphery of each gum roll, said edges being above the surface of the supply of gum, and passages through said comb to permit gum collecting thereon to be discharged into the supply of gum.

3. The combination with a gum box having a supply of gum therein and a rotary gum roll partially submerged in said supply, of a comb or stripper paralleling said roll and presenting a substantially continuous straight edge in closely spaced relation to the roll's periphery, said comb or stripper having a series of vertical passages therethrough for the gravity discharge to said supply of any gum collecting on its upper surface.

JOHN DERMODY.